United States Patent [19]
Vaughan

[11] Patent Number: 5,267,415
[45] Date of Patent: Dec. 7, 1993

[54] WAIST BELT WITH SEMI-FLUSH BELT WEATHERSTRIP

[75] Inventor: Robert A. Vaughan, Dearborn, Mich.

[73] Assignee: The Standard Products Company, Cleveland, Ohio

[21] Appl. No.: 978,923

[22] Filed: Nov. 19, 1992

[51] Int. Cl.$^5$ ............................................. B60J 1/16
[52] U.S. Cl. .................................... 49/377; 49/374; 49/489.1
[58] Field of Search ............... 49/374, 375, 377, 475, 49/489, 492, 498

[56] References Cited

U.S. PATENT DOCUMENTS

| | | | |
|---|---|---|---|
| 2,664,603 | 1/1954 | McKinney | 49/377 |
| 3,763,596 | 10/1973 | Anderson | 49/492 X |
| 4,606,149 | 8/1986 | Hamada et al. | 49/377 X |
| 4,635,947 | 1/1987 | Hatayama | 49/377 X |
| 4,696,128 | 9/1987 | Fukuhara | 49/377 X |
| 4,864,774 | 9/1989 | Onishi et al. | 49/492 |
| 4,949,507 | 8/1990 | Vaughan | 49/377 X |
| 4,969,303 | 11/1990 | Emmons | |
| 4,984,389 | 1/1991 | Benoit et al. | |
| 5,018,308 | 5/1991 | Vaughan | 49/491 |
| 5,095,655 | 3/1992 | Warren | 49/377 X |
| 5,170,586 | 12/1992 | Ose et al. | 49/377 |

FOREIGN PATENT DOCUMENTS

2221487 2/1990 United Kingdom ................ 49/489

*Primary Examiner*—Peter M. Cuomo
*Assistant Examiner*—Michael Milano
*Attorney, Agent, or Firm*—Harness, Dickey & Pierce

[57] ABSTRACT

A waist belt for an automotive vehicle has a channel member secured to a vertically extending door skin. The channel member has vertically open slots. A belt weatherstrip has a core that is at least partially covered with an elastomeric material. This core has a plurality of legs which extend downwardly into the slots thereby maintaining the weatherstrip in a held relationship with respect to the waist belt.

8 Claims, 3 Drawing Sheets

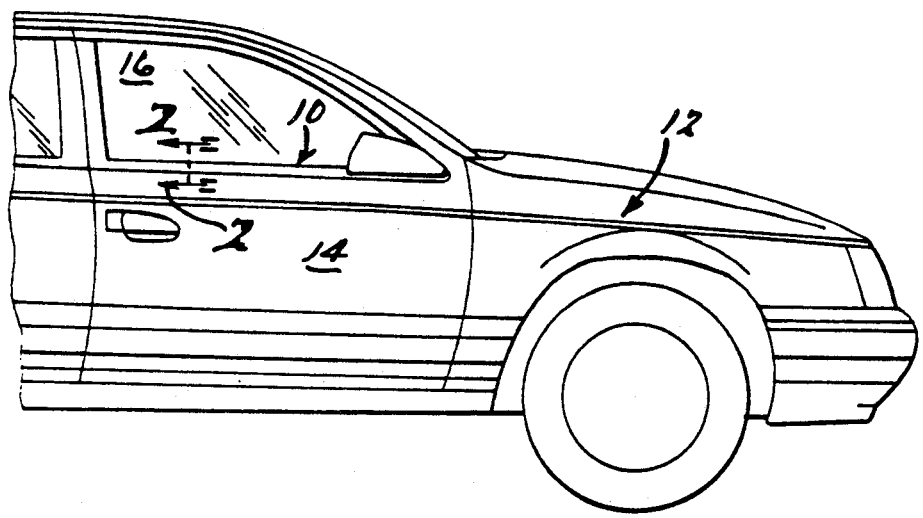
Fig. 1.
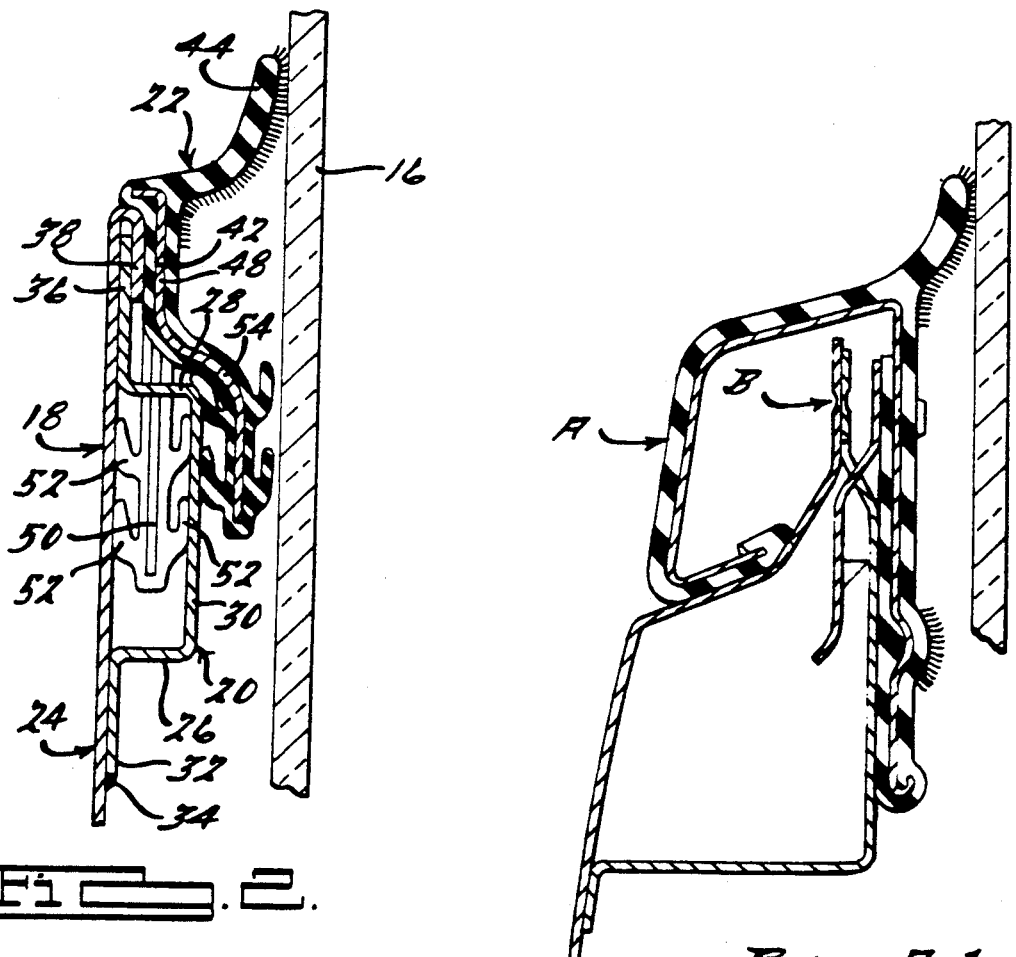
Fig. 2.
Prior Art
Fig. 3.

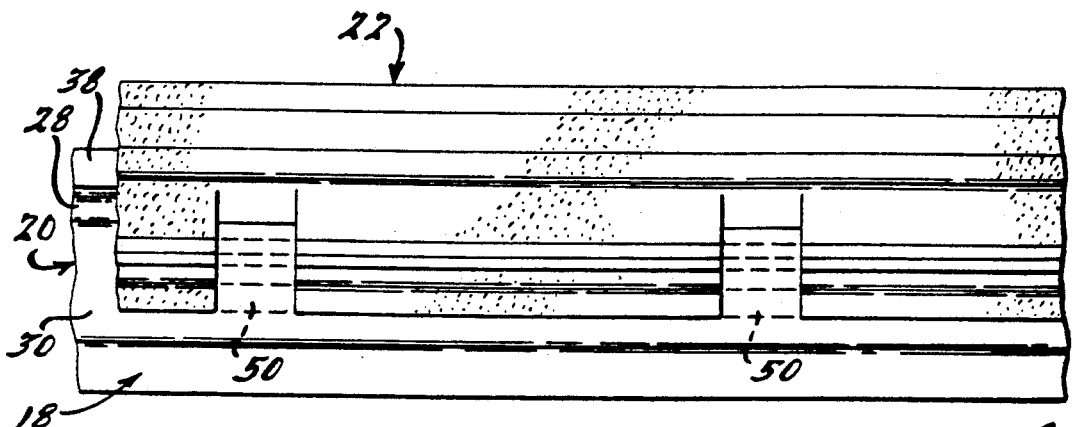
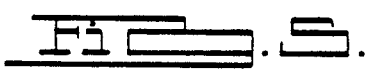
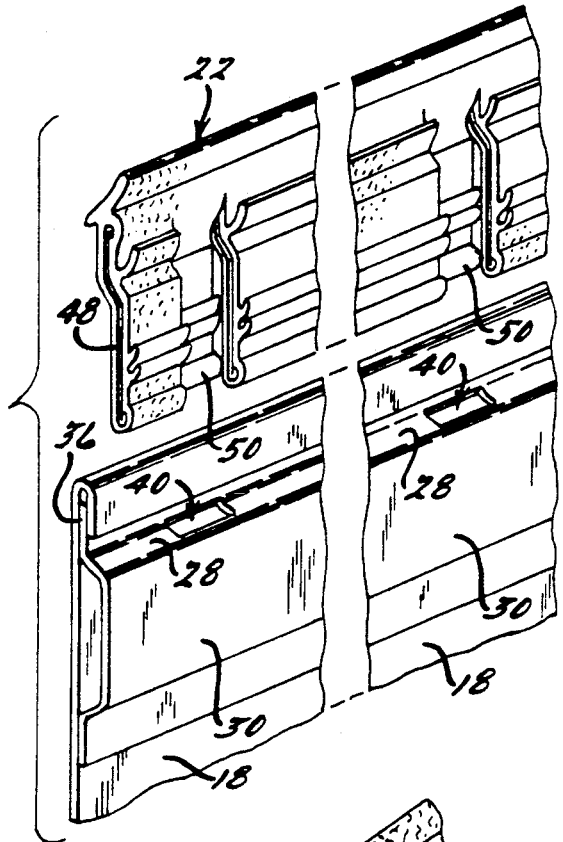
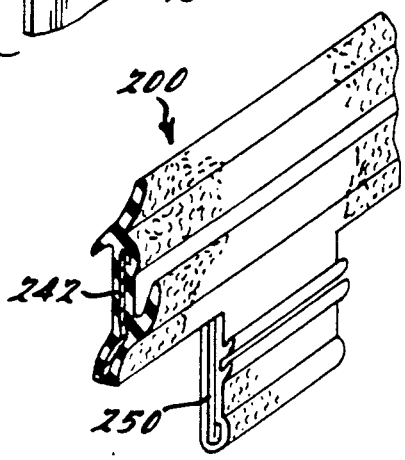

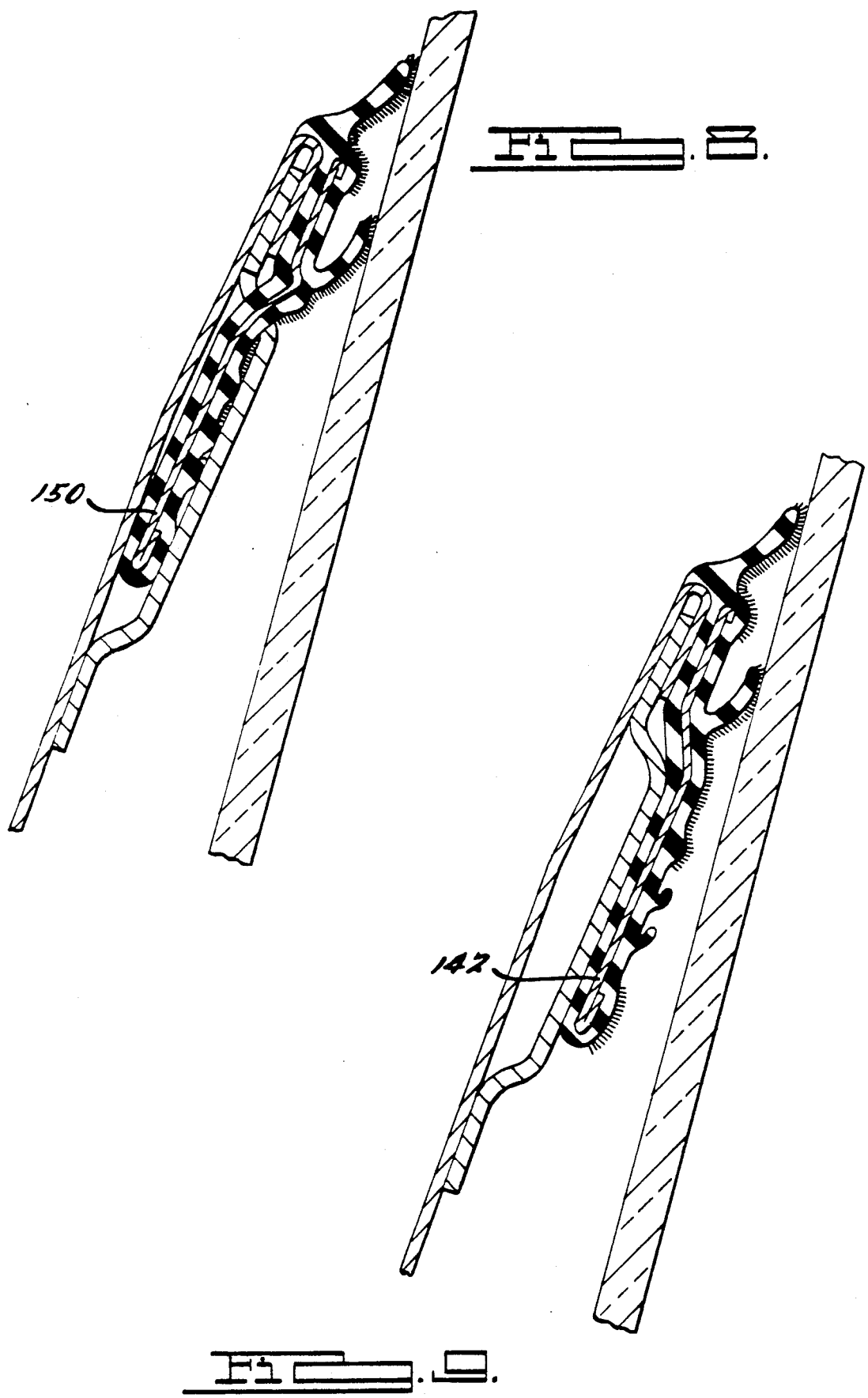

WAIST BELT WITH SEMI-FLUSH BELT WEATHERSTRIP

BACKGROUND OF THE INVENTION

The present invention relates to automotive waist belt constructions. More particularly, the present invention relates to a waist belt construction including a belt weatherstrip for an automotive vehicle.

Conventional automotive vehicles have doors with vertically moveable windowpanes. A belt weatherstrip molding is employed along the lower edge of the window pane to protect against the weather environment and to improve the appearance of the vehicle. The moveable windowpane is referred to as drop glass, and the upper metal flange of the outer door panel of the vehicle into which the windowpane drops is referred to as the waist belt of the automobile door. Belt weatherstrips are generally secured to waist belts by metal clips. However, improved belt weatherstrips have been disclosed in U.S. Pat. No. 4,969,303 Nov. 13, 1990 to Emmons and in U.S. Pat. No. 5,018,308 May 28, 1991 to Vaughan.

There remains, however, room for improvement in belt weatherstrip arrangements. Accordingly, the present invention provides an improved waist belt having an outer belt weatherstrip which affords an automotive stylist a means to minimize the amount of black weatherstrip seen at the waist belt. The present invention also affords an automotive stylist means to minimize the amount of offset between the outer surface of drop glass and the sheet metal of the outer door panel of a conventional metal automotive door. This obtains a semi-flush construction and provides a continuous condition along the side of the vehicle which is not only aesthetically pleasing, but also aids in smoothing the outer surface of the vehicle which can improve the aerodynamic properties of the vehicle.

Most automotive vehicles employ a reinforcing bracket attached by a pinchweld flange along the waist belt area of the automotive door. The present invention employs a hem flange instead of a pinchweld flange to fasten the panel to its reinforcement. The purpose of the reinforcement is to strengthen the belt opening of the door. In accordance with the present invention, the reinforcement is shaped to form a box channel when mated to the inner or outer door panel of the door and upward facing slots are provided in the box channel. The slots cooperate with downwardly extending legs of a cooperating belt weatherstrip which extend therein. This construction minimizes the amount of black weatherstrip presented to the eye at the waist belt, minimizes the offset between drop glass and sheet metal outer surfaces and obtains a semi-flush construction.

Further understanding of the present invention will be had from the following disclosure and claims taken in conjunction with the accompanying drawings.

SUMMARY OF THE INVENTION

A waist belt construction for an automobile has:

a vertically upwardly extending waist belt flange edge with an elongated horizontally extending reinforcing channel member secured thereon, said channel member having a plurality of upwardly open slots therein; and a belt weatherstrip attached to said flange edge, said weatherstrip having a core at least partially covered with elastomeric material, said core having legs extending vertically downwardly therefrom, said downwardly extending legs engaging said channel member by extending into the upwardly open slots thereof.

BRIEF DESCRIPTION OF THE DRAWINGS

FIG. 1 is a side elevation, broken away, of an automotive vehicle having a preferred embodiment of a waist belt construction of the present invention.

FIG. 2 is a cross-sectional view taken along line 2—2 in FIG. 1 and showing a preferred embodiment of the present invention.

FIG. 3 is a cross-sectional view analogous to FIG. 2 but showing a prior art waist belt construction.

FIG. 4 is a rear elevational view of the preferred embodiment of FIGS. 1 and 2.

FIG. 5 is an exploded, perspective view, broken away, showing the preferred embodiment of FIGS. 1, 2 and 4.

FIG. 6 is a perspective view, broken away, showing an alternative belt weatherstrip of the present invention.

FIG. 7 is a perspective view, broken away, showing another alternative belt weatherstrip of the present invention.

FIG. 8 is a sectional view showing a waist belt construction including the belt weatherstrip of FIG. 6 with the section being taken through a leg of the core of the belt weatherstrip.

FIG. 9 is a sectional view of the waist belt construction of FIG. 8 taken through the core thereof.

DESCRIPTION OF THE INVENTION

Now referring to FIG. 1, a preferred embodiment of a waist belt construction of the present invention is indicated generally by the numeral 10 and is shown on an automotive vehicle 12. Waist belt construction 10 is located on door 14 of automotive vehicle 12 along the lower edge of window pane 16. Waist belt construction 10 generally comprises a waist belt flange 18 with a reinforcing channel member 20 having a belt weatherstrip 22 secured thereon in the manner described herein.

Waist belt flange 18 is the upper flange edge of outer door panel 24 and extends generally vertically. For increased strength, a channel member 20 extends horizontally along waist belt flange 18. Channel member 20 has legs 26 and 28 joined by web 30. Leg 26 has skirt 32 secured to waist belt flange 18, for example, by adhesive 34. Leg 28 has skirt 36 which is secured to the upper edge portion of waist belt flange 18 by hem flange 38 which is the reversely bent upper edge portion of waist belt flange 18. It will be well appreciated by those skilled in the art that this method of attaching channel member 20 provides an upper edge portion of waist belt flange 28 which is free of weld spots or other discontinuities which would detract from the appearance of the outer door panel, thus providing a smooth outer surface and a continuous condition along the waist belt.

As is best shown in FIG. 5, a plurality of spaced apart apertures 40 are provided in leg 28. Of course, aperture 40 can extend partially into skirt 36 and web 30 as shown in FIG. 5.

Belt weatherstrip 22 has a metal core 42 which carries lip 44 with flocking or other low friction surface for contacting window pane 16. Core 42 has a main body portion 48 with a plurality of horizontally spaced apart downstanding legs 50. Downstanding legs 50 can be stamped from main body portion 48 in a conventional press.

As is shown in FIG. 2, belt weatherstrip 22 is secured to box channel 20 and waist belt flange 18 in the following manner. The plurality of downstanding legs 50 extend through corresponding plurality of upwardly facing apertures 40 and box channel 20. A plurality of elastomer retaining ribs 52 are held in compression between box channel 20 and waist belt flange 18 pressing against the inwardly facing surfaces of waist belt flange 18 and web 30 of box channel 20. Additional elastomeric sealing ribs 54 are carried on the lower edge portion of main body portion 48 of core 42 and sealingly engage the outwardly facing side of web 30.

FIG. 3 shows a conventional prior art waist belt construction. As is well illustrated by comparing FIG. 3 with FIG. 2, the waist belt construction of the present invention offers a structure which is relatively thin when compared to the method of construction illustrated in FIG. 3 which requires that a part "A" of the belt weatherstrip extends over spot welds "B" to cover them from casual view. Thus, the present invention not only has the advantage of a thin profile but also in presenting only a thin strip of elastomeric material to casual view.

Now referring to FIGS. 6, 8 and 9, an alternative embodiment of a belt weatherstrip for use in accordance with the present invention is shown and indicated generally by the numeral 100. Belt weatherstrip 100 has a core 142 with downwardly extending insertion tabs 150. Downwardly extending insertion tabs 150 function in a manner analogous to tabs 50 of belt weatherstrip 22. Belt weatherstrip 100 is well adapted for use in waist belt construction as illustrated in FIGS. 8 and 9, with FIG. 8 being a sectional view taken through the downstanding leg 150 of belt weatherstrip 100 and FIG. 9 being a sectional view taken through the portion of core 142 which does not have a leg 150 stamped therefrom.

Now referring to FIG. 7, still another alternative embodiment of a belt weatherstrip of the present invention is shown and indicated by the numeral 200. Belt weatherstrip 200 has a core 242 with downwardly extending insertion tabs 250. Tabs 250 function in a manner analogous to tabs 50 and 150 but are stamped from core 242 so as to extend below the bottom edge thereof.

While the above description sets forth preferred embodiments of the present invention, it is to be appreciated that the invention is subject to modification, variation and change without departing from the proper scope and fair meaning of the accompanying claims.

What is claimed is:

1. A waist belt construction for an automative vehicle, said waist belt construction having:
   a vertically upwardly extending waist belt flange edge with an elongated horizontally extending reinforcing channel member secured thereon, said channel member having a plurality of upwardly open slots therein; and
   a belt weatherstrip attached to said flange edge, said weatherstrip having a core at least partially covered with elastomeric material, said core having legs extending vertically downwardly therefrom, said downwardly extending legs engaging said channel member by extending into the upwardly open slots thereof.

2. A waist belt construction as in claim 1 wherein said downwardly extending legs have a plurality of elastomeric retaining ribs.

3. A waist belt construction as in claim 1 wherein said weatherstrip core has a plurality of elastomeric sealing ribs.

4. A waist belt construction as in claim 1 wherein said downwardly extending legs are held in compression within said reinforcing channel.

5. A waist belt construction as in claim 1 wherein said downwardly extending legs and said core hold a wall of said channel in compression therebetween.

6. A waist belt construction as in claim 1 wherein said downwardly extending legs have free ends extending below said core.

7. A waist belt construction as in claim 1 wherein a lower edge of said core extends below said downwardly extending legs.

8. A waist belt construction as in claim 1 wherein a lower edge of said core and free ends of said downwardly extending legs extend substantially the same distance downwardly from said core.

* * * * *